US012333189B2

(12) United States Patent
Peisakhov et al.

(10) Patent No.: US 12,333,189 B2
(45) Date of Patent: Jun. 17, 2025

(54) FAILURE RECOVERY USING COMMAND HISTORY BUFFER IN STORAGE DEVICE

(71) Applicant: Western Digital Technologies, Inc., San Jose, CA (US)

(72) Inventors: Nataniel Peisakhov, Petah Tikva (IL); Roman Livshits, Hadera (IL); Natan Tabachnik, Irus (IL); Moshe Karni, Rehovot (IL); Maor Katz, Rishon Lezion (IL); Paz Ben Aharon, Ramat Gan (IL)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 18/352,149

(22) Filed: Jul. 13, 2023

(65) Prior Publication Data
US 2024/0168682 A1    May 23, 2024

Related U.S. Application Data

(60) Provisional application No. 63/426,681, filed on Nov. 18, 2022.

(51) Int. Cl.
*G06F 3/06* (2006.01)
*G06F 11/14* (2006.01)

(52) U.S. Cl.
CPC .......... *G06F 3/0659* (2013.01); *G06F 3/0619* (2013.01); *G06F 3/0688* (2013.01); *G06F 11/1402* (2013.01); *G06F 2212/7207* (2013.01)

(58) Field of Classification Search
CPC .... G06F 3/0659; G06F 3/0619; G06F 3/0688; G06F 3/0679; G06F 11/1402
See application file for complete search history.

(56) References Cited

U.S. PATENT DOCUMENTS

| | | |
|---|---|---|
| 7,904,604 B2 | 3/2011 | Lum et al. |
| 9,170,878 B2 | 10/2015 | Haywood et al. |
| 11,119,671 B2 | 9/2021 | Cheng |
| 2016/0216907 A1* | 7/2016 | Chang .................. G06F 3/0656 |
| 2017/0315889 A1* | 11/2017 | Delaney .............. G06F 11/1441 |
| 2019/0369916 A1* | 12/2019 | Khon ..................... G06F 3/0659 |
| 2020/0233607 A1* | 7/2020 | Kudoh .................. G06F 3/0659 |
| 2021/0182192 A1 | 6/2021 | Benjamin et al. |
| 2021/0311888 A1 | 10/2021 | Shallal et al. |
| 2022/0107758 A1* | 4/2022 | Benisty ................. G06F 3/0679 |

* cited by examiner

*Primary Examiner* — Kalpit Parikh
(74) *Attorney, Agent, or Firm* — Morgan, Lewis & Bockus LLP (57) ABSTRACT

A data storage device for providing failure recovery may include a device memory including one or more memories and a command history buffer. The device memory may be configured to receive and process (i) commands directed to the one or more memories, and (ii) an access command for accessing the command history buffer. The command history buffer may be configured to store information related to the commands. The data storage device may also include a controller coupled to the device memory and configured to: send the commands to the device memory; retrieve information stored in the command history buffer from the device memory, by issuing the access command; and in accordance with a determination that the information stored in the command history buffer indicates invalid command flows, resend at least a portion of the commands to the device memory.

19 Claims, 5 Drawing Sheets

FAILURE RECOVERY USING COMMAND HISTORY BUFFER IN STORAGE DEVICE

CROSS-REFERENCE TO RELATED APPLICATION

This application claims the benefit of U.S. Provisional Application No. 63/426,681, filed on Nov. 18, 2022, the entirety of which is incorporated herein by reference for all purposes.

BACKGROUND

Storage devices enable users to store and retrieve data. Examples of storage devices include non-volatile memory devices. A non-volatile memory generally retains data after a power cycle. An example of a non-volatile memory is a flash memory, which may include one or more arrays of not-and (NAND) cells on one or more dies. Flash memory may be found in solid state devices (SSDs), secure digital (SD) cards, and the like. A flash storage device may store control information associated with data. For example, a flash storage device may maintain control tables that include a mapping of logical addresses to physical addresses. These control tables may be used to track the physical location of logical sectors or blocks, in the flash memory. The control tables are stored in the non-volatile memory to enable access to the stored data after a power cycle.

Flash memory devices that include one or more arrays of NAND cells may encounter failures during boot flows or during normal operations. Examples of such failures include voltage drops, NAND timing violation, and noise or error on a NAND bus. For failure diagnosis, conventional systems do not provide data on commands received by the NAND array, although information on commands sent to the NAND array may be available. Due to the unavailability of information regarding the state of NAND during or before failures, there is uncertainty regarding the cause of failure. For example, the last command sequence that was latched and executed on the NAND side may be beneficial in failure diagnosis, but such information is unavailable in traditional storage devices. A NAND specification violation can sometimes cause a wrong command recognition and unexpected behavior, at boot time or during operation. It may be difficult or even impossible to discover the actual NAND state. Moreover, there is no practical way to save the last command(s) latched or performed by the NAND.

The description provided in the background section should not be assumed to be prior art merely because it is mentioned in or associated with the background section. The background section may include information that describes one or more aspects of the subject technology, and the description in this section does not limit the invention.

BRIEF DESCRIPTION OF THE DRAWINGS

A detailed description will be made with reference to the accompanying drawings.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology may be practiced without these specific details. In some instances, structures and components are shown in block diagram form in order to avoid obscuring the concepts of the subject technology. Like components are labeled with identical element numbers for ease of understanding.

Figure 1:
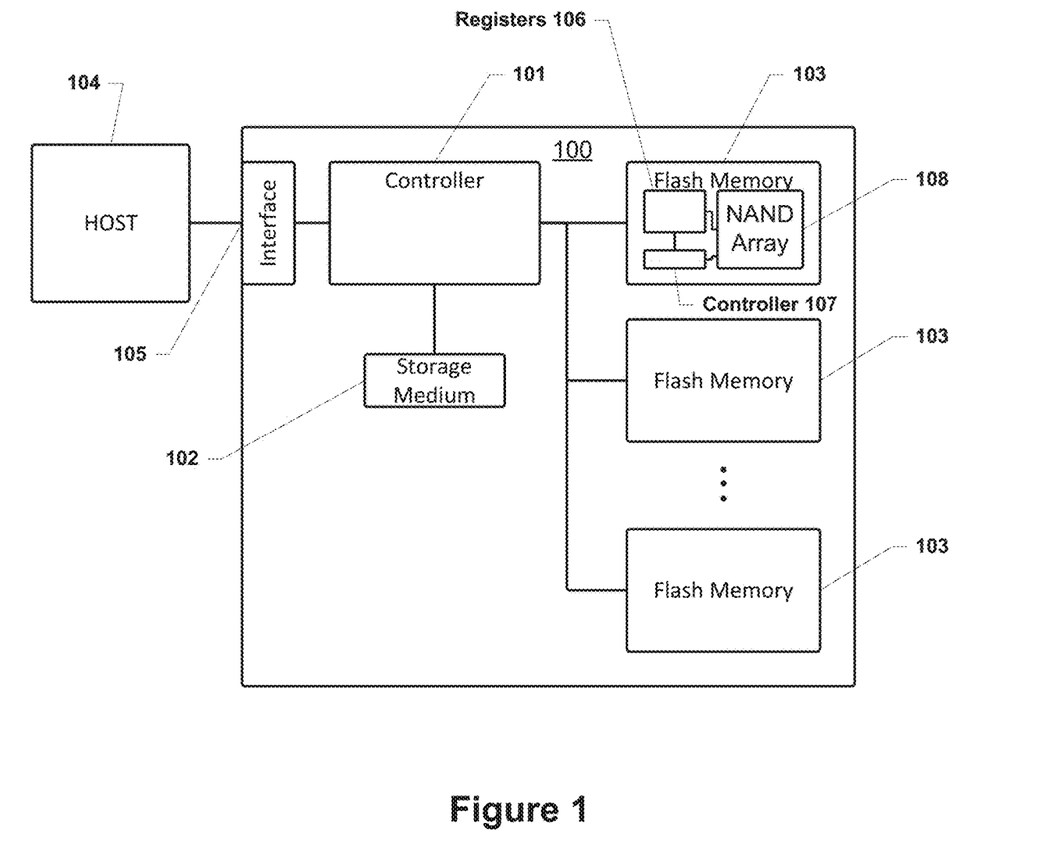
FIG. 1 is a block diagram illustrating components of an example data storage system, according to one or more embodiments.

The present description relates in general to data storage systems and methods, and more particularly to, for example, without limitation, providing failure recovery using a command history buffer in a storage device. The command history buffer may help improve the boot flow in NAND array(s) and help provide a built-in self-test, allowing for a better handshake in the NAND operations, hence saving time and power. In addition, such information may be useful for failure analysis and for design and validation flows. Furthermore, this information may be of benefit to other storage device controller flows allowing firmware in such devices to monitor the command history buffer and check the NAND status with more precision, and retrieve current NAND status, commands that are already performed, and commands that are still being processed. The techniques described herein may help make the decision of shutdown become data dependent versus voltage dependent (e.g., data dependent rather than voltage dependent). This is because the system has the opportunity to determine the NAND state using the command history buffer even in a low or high voltage. If a command sent by the controller 101 to the NAND array 108 is received correctly, then the command sent by the controller 101 and the command stored in the command history buffer would be the same. This indicates that the NAND array operation is valid, even if the flash memory 103 (or the NAND array 108) operates at a low or high power state. This provides the system (e.g., the flash memory 103 or the NAND array 108) more marginal voltage. For example, if a NAND array 108 is specified to operate with a power supply voltage (e.g., VCC) of about 1.9 V to 2.1 V, and if the NAND array 108's power supply voltage drops below 1.9 V, then a typical NAND array (without using the techniques described herein) may be forced to be shut down. However, using the techniques described herein, if the controller 101 determines that the command history buffer contains a valid command (e.g., contains the same command as the command sent by the controller 101), then even if the power supply voltage decreases below 1.9 V, the controller 101 can allow the NAND array 108 to continue to operate. Hence, the techniques described herein can provide more marginal voltage. Moreover, these techniques may help provide better failure analysis capability and significant improvement of the ability to discover erroneous firmware or controller behavior and possible NAND specification violation, thereby saving resources for debug and failure analysis. Some aspects may use circuit bounded array (CbA) architecture that separates CMOS wafer and NAND array wafer, which in turn increases three-dimensional (3D) stacking and improves cost, power, and I/O (Input/Output) performance.

FIG. 1 is a block diagram illustrating components of an example data storage system, according to aspects of the subject technology. A data storage system may be sometimes referred to as a system, a data storage device, a storage device, or a device. As depicted in FIG. 1, in some aspects, a data storage system 100 (e.g., a solid-state drive (SSD)) includes a data storage controller 101, a storage medium 102, and a flash memory array including one or more flash memory 103. The controller 101 may use the storage medium 102 for temporary storage of data and information used to manage the data storage system 100. The controller 101 may include several internal components (not shown), such as a read-only memory, other types of memory, a flash component interface (e.g., a multiplexer to manage instruction and data transport along a serial connection to the flash memory 103), an input/output (I/O) interface, error correction circuitry, and the like. In some aspects, the elements of the controller 101 may be integrated into a single chip. In other aspects, these elements may be separated on their own personal computer (PC) board.

In some implementations, aspects of the subject disclosure may be implemented in the data storage system 100. For example, aspects of the subject disclosure may be integrated with the function of the data storage controller 101 or may be implemented as separate components for use in conjunction with the data storage controller 101.

The controller 101 may also include a processor that may be configured to execute code or instructions to perform the operations and functionality described herein, manage request flow and address mappings, and to perform calculations and generate commands. The processor of the controller 101 may be configured to monitor and/or control the operation of the components in the data storage controller 101. The processor may be a microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on read-only-memory (ROM) within the controller 101 and/or its processor. One or more sequences of instructions may be software stored and read from the storage medium 102, the flash memory 103, or received from a host device 104 (e.g., via a host interface 105). ROM, the storage medium 102, the flash memory 103, represent examples of machine or computer readable media on which instructions/code executable by the controller 101 and/or its processor may be stored. Machine or computer readable media may generally refer to any medium or media used to provide instructions to the controller 101 and/or its processor, including volatile media, such as dynamic memory used for the storage media 102 or for buffers within the controller 101, and non-volatile media, such as electronic media, optical media, and magnetic media.

In some aspects, the controller 101 may be configured to store data received from the host device 104 in the flash memory 103 in response to a write command from the host device 104. The controller 101 is further configured to read data stored in the flash memory 103 and to transfer the read data to the host device 104 in response to a read command from the host device 104. A host device 104 may be sometimes referred to as a host, a host system, or a host computer.

The host device 104 represents any device configured to be coupled to the data storage system 100 and to store data in the data storage system 100. The host device 104 may be a computing system such as a personal computer, a server, a workstation, a laptop computer, a personal digital assistant (PDA), a smart phone, or the like. Alternatively, the host device 104 may be an electronic device such as a digital camera, a digital audio player, a digital video recorder, or the like.

In some aspects, the storage medium 102 represents volatile memory used to temporarily store data and information used to manage the data storage system 100. According to aspects of the subject technology, the storage medium 102 is random access memory (RAM), such as double data rate (DDR) RAM. Other types of RAMs may be also used to implement the storage medium 102. The memory 102 may be implemented using a single RAM module or multiple RAM modules. While the storage medium 102 is depicted as being distinct from the controller 101, those skilled in the art will recognize that the storage medium 102 may be incorporated into the controller 101 without departing from the scope of the subject technology. Alternatively, the storage medium 102 may be a non-volatile memory, such as a magnetic disk, flash memory, peripheral SSD, and the like.

As further depicted in FIG. 1, the data storage system 100 may also include the host interface 105. The host interface 105 may be configured to be operably coupled (e.g., by wired or wireless connection) to the host device 104, to receive data from the host device 104 and to send data to the host device 104. The host interface 105 may include electrical and physical connections, or a wireless connection, for operably coupling the host device 104 to the controller 101 (e.g., via the I/O interface of the controller 101). The host interface 105 may be configured to communicate data, addresses, and control signals between the host device 104 and the controller 101. Alternatively, the I/O interface of the controller 101 may include and/or be combined with the host interface 105. The host interface 105 may be configured to implement a standard interface, such as a small computer system interface (SCSI), a serial-attached SCSI (SAS), a fiber channel interface, a peripheral component interconnect express (PCIe), a serial advanced technology attachment (SATA), a universal serial bus (USB), or the like. The host interface 105 may be configured to implement only one interface. Alternatively, the host interface 105 (and/or the I/O interface of controller 101) may be configured to implement multiple interfaces, which may be individually selectable using a configuration parameter selected by a user or programmed at the time of assembly. The host interface 105 may include one or more buffers for buffering transmissions between the host device 104 and the controller 101. The host interface 105 (or a front end of the controller 101) may include a submission queue 110 to receive commands from the host device 104. For input-output (I/O), the host device 104 may send commands, which may be received by the submission queue 110 (e.g., a fixed size circular buffer space). In some aspects, the submission queue may be in the controller 101. In some aspects, the host device 104 may have a submission queue. The host device 104 may trigger a doorbell register when commands are ready to be executed. The controller 101 may then pick up entries from the submission queue in the order the commands are received, or in an order of priority.

The flash memory 103 may represent a non-volatile memory device for storing data. According to aspects of the subject technology, the flash memory 103 includes, for example, a NAND flash memory. The flash memory 503 may include a single flash memory device or chip, or (as depicted in FIG. 1) may include multiple flash memory devices or chips arranged in multiple channels. The flash memory 103 is not limited to any capacity or configuration. For example, the number of physical blocks, the number of physical pages per physical block, the number of sectors per physical page, and the size of the sectors may vary within the scope of the subject technology.

The flash memory may have a standard interface specification so that chips from multiple manufacturers can be used interchangeably (at least to a large degree). The interface hides the inner working of the flash and returns only internally detected bit values for data. In aspects, the interface of the flash memory 103 is used to access one or more internal registers 106 and an internal flash controller 107 for communication by external devices (e.g., the controller 101). In some aspects, the registers 106 may include address, command, and/or data registers, which internally retrieve and output the necessary data to and from a NAND memory cell array 108. A NAND memory cell array 108 may be sometimes referred to as a NAND array, a memory array, or a NAND. For example, a data register may include data to be stored in the memory array 108, or data after a fetch from the memory array 108 and may also be used for temporary data storage and/or act like a buffer. An address register may store the memory address from which data will be fetched to the host device 104 or the address to which data will be sent and stored. In some aspects, a command register is included to control parity, interrupt control, and the like. In some aspects, the internal flash controller 107 is accessible via a control register to control the general behaviour of the flash memory 103. The internal flash controller 107 and/or the control register may control the number of stop bits, word length, receiver clock source, and may also control switching the addressing mode, paging control, coprocessor control, and the like.

In some aspects, the registers 106 may also include a test register. The test register may be accessed by specific addresses and/or data combinations provided at the interface of flash memory 103 (e.g., by specialized software provided by the manufacturer to perform various tests on the internal components of the flash memory). In further aspects, the test register may be used to access and/or modify other internal registers, for example the command and/or control registers. In some aspects, test modes accessible via the test register may be used to input or modify certain programming conditions of the flash memory 103 (e.g., read levels) to dynamically vary how data is read from the memory cells of the memory arrays 108. The registers 106 may also include one or more data latches coupled to the flash memory 103.

In some aspects, the registers 106 may include a command history buffer configured to store information related to commands sent to the device memory 103. The information may include NAND bus command sequences. In some aspects, as shown in FIG. 1, a device memory (e.g., one 103) may include one or more memories (e.g., one 108) and a command history buffer (as part of the registers 106). Although not shown, in some aspects, the one or more device memories (103s) may include one or more memories (108s) and one or more command history buffers. Each of the one or more device memories may include at least one of the one or more memories and one of the one or more command history buffers. In some aspects, the one or more device memories, each of the one or more device memories may include a memory and a command history buffer. In some aspects, the command history buffer may be in a latch in the NAND memory or in 107. In one or more aspects, the command history buffer may be in one of the 108's (non-volatile memory), in one of the registers 106, in non-volatile memory or a volatile memory in 103 (e.g., in 107). In one or more aspects, the command history buffer is not in 102 or 101. These aspects are further described below in reference to FIGS. 2, 3, 4A and 4B.

It should be understood that in all cases data may not always be the result of a command received from the host 104 and/or returned to the host 104. In some aspects, the controller 101 may be configured to execute a read operation independent of the host 104 (e.g., to verify read levels or BER). The predicate words "configured to," "operable to," and "programmed to" as used herein do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Figure 2:
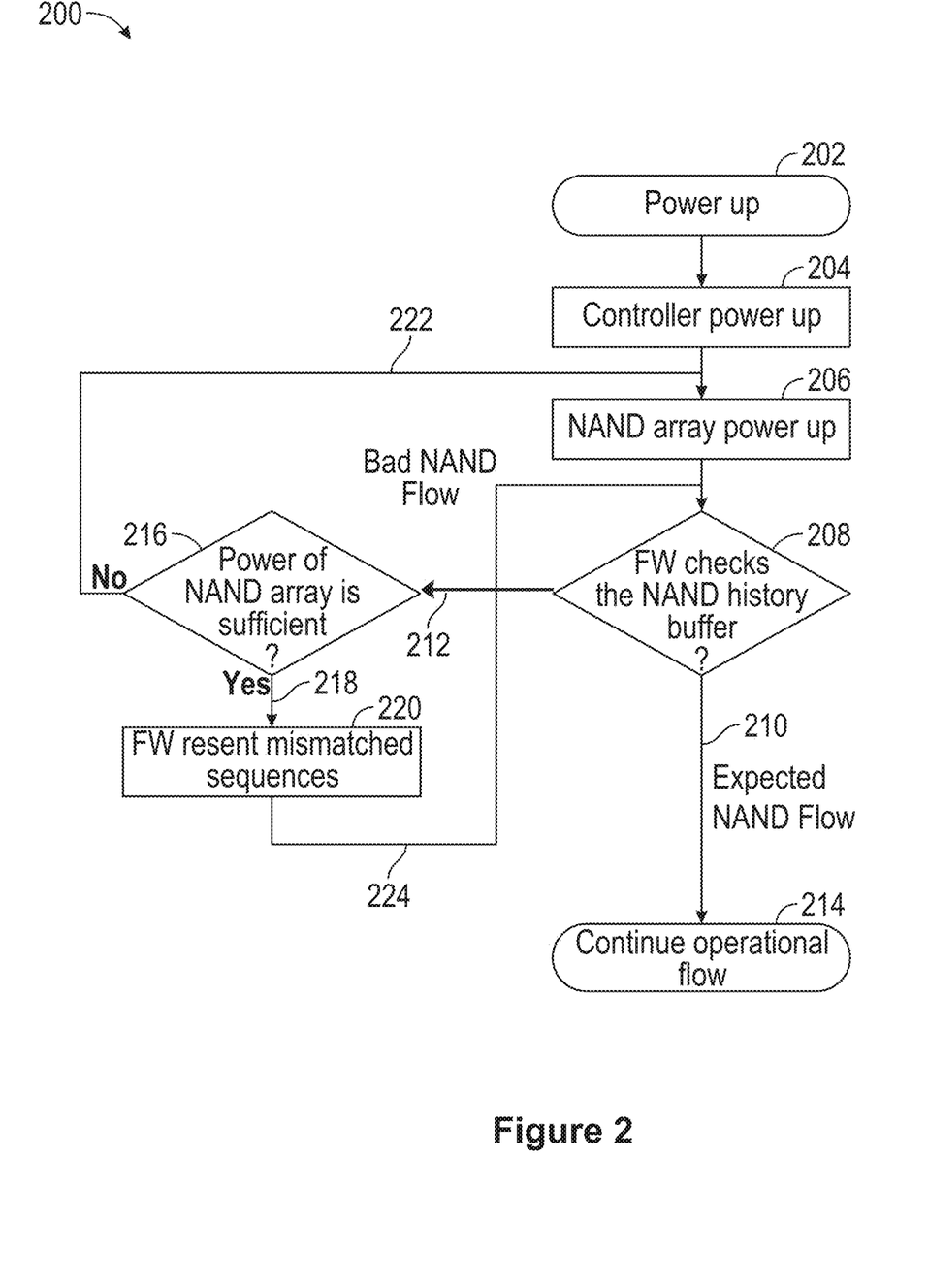
FIG. 2 is a flowchart of an example method for failure recovery using a command history buffer in data storage devices, according to one or more embodiments.
Figure 3:
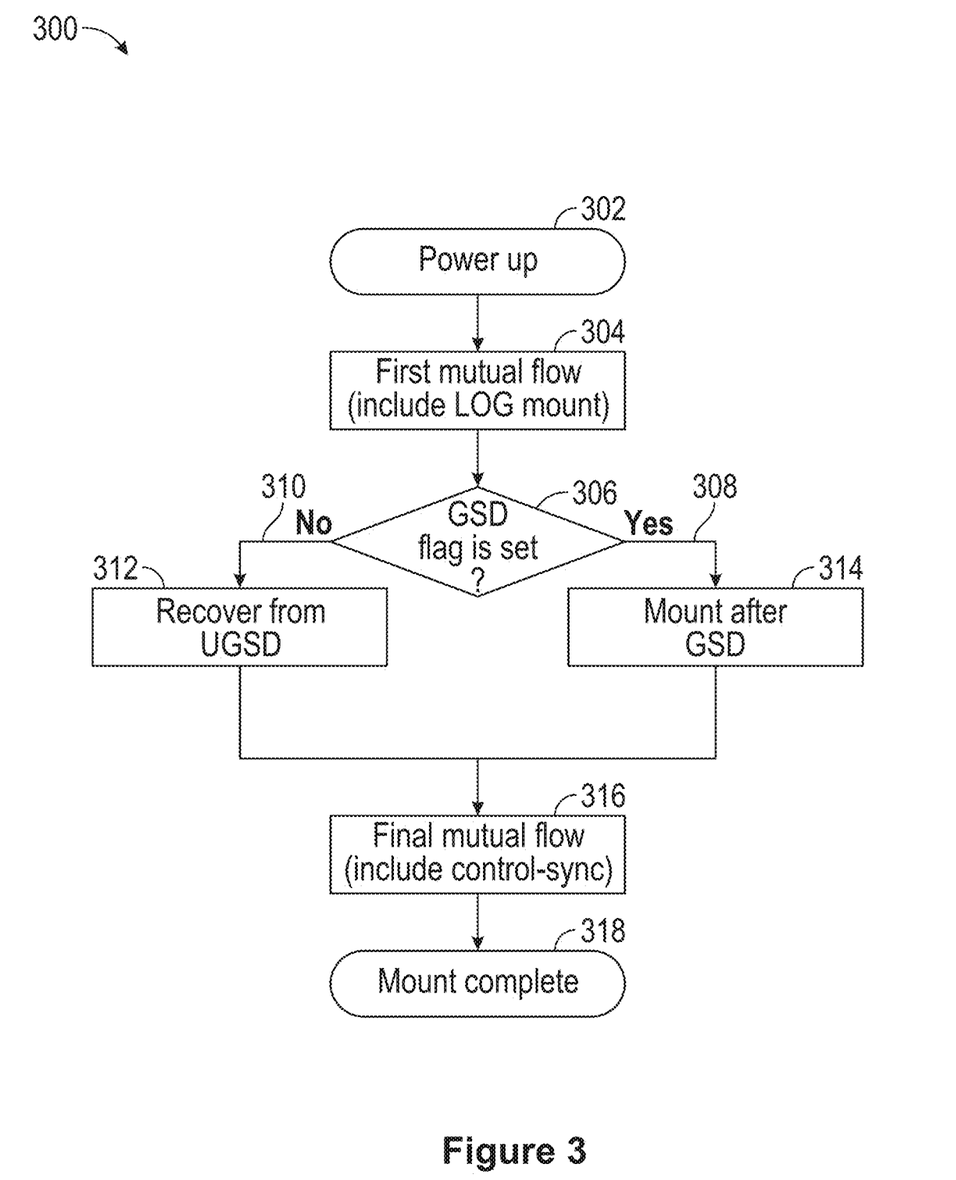
FIG. 3 is a flowchart of an example method for high level mount flow in data storage devices, according to one or more embodiments.
Figure 5:
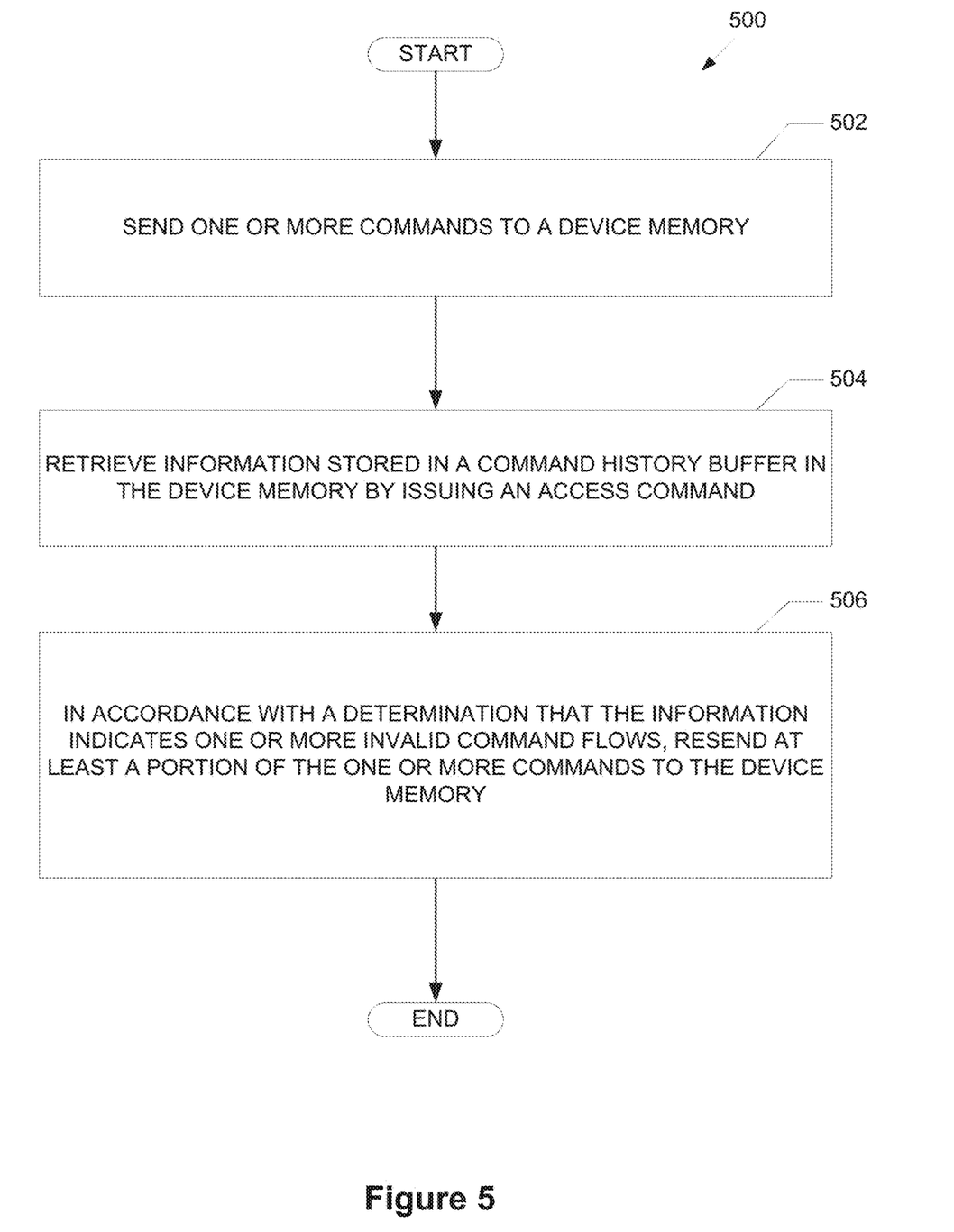
FIG. 5 is a flowchart illustrating an example process for failure recovery using a command history buffer in a data storage device, according to one or more embodiments.

The controller 101 may perform the operations identified in blocks 202-214, blocks 302-318, and/or blocks 502-506. The controller 101 may cause the operations identified in blocks 202-214, blocks 302-318, and/or blocks 502-506 to occur, or the controller 101 may provide instructions to cause or facilitate the controller 107 (and the registers 106) to perform operations identified in blocks 202-214, blocks 302-318, and/or blocks 502-506.

FIG. 2 is a flowchart of an example method 200 for failure recovery using a command history buffer in data storage devices, according to one or more embodiments. When a system powers up (202) (e.g., the device 100 powers up), the controller 101 powers up (204), following which the NAND array 108 powers up (206). Typically, the controller 101 may start operating at approximately 0.9 Volt (VCCq) but the NAND may start operating at approximately 1.9 Volt (VCC). While the NAND array is powering up, a firmware in the controller 101 may check (208) the NAND history buffer to determine if the NAND array had undergone an invalid flow (sometimes called a bad NAND flow) for the NAND array 108 (the bad flow may indicate a bad NAND state). If the NAND history buffer (sometimes called a command history buffer) does not indicate a bad NAND flow (path labeled 210), the firmware continues normal operations. A bad NAND flow may be indicated by a mismatch between commands sent to the NAND array versus commands (or information related to command sequences) as received by the NAND array. A good NAND flow (sometimes called a valid command flow) indicates that the command flow in the NAND array was not damaged with erroneous bits due to voltage drops or other bus errors that would cause operational failure and possible reset by the host or the controller 101. On the other hand, if the NAND history buffer does indicate a bad NAND flow (path labeled 212), the controller 101 may determine if a power of NAND array is sufficient. If the power is insufficient (path labeled 222), the controller 101 may wait until the NAND array powers up. If the NAND array has sufficiently powered up (path labeled 218), the firmware may resend (220) mismatched sequences to the NAND array. The firmware may repeat this process (e.g., determining if the NAND history buffer, determining if the power of the NAND array is sufficient) several times during operation. Alternatively, or additionally, this process may be performed only during a boot flow, a built-in self-test, or as part of an initial handshake with the NAND array. To distinguish voltage, drop/droop events, for example, because the controller can work at a lower voltage than the NAND array, the techniques described herein may help provide the firmware sufficient power and time to validate that the data received by the NAND was not damaged. Typically, below a particular voltage threshold (e.g., 1.9 Volts) the NAND may determine whether to reset itself. The techniques described herein may help save power and time and allow continuation of the device operation when the data is valid.

FIG. 3 is a flowchart of an example method 300 for high level mount flow in data storage devices, according to one or more embodiments. Non-volatile memory storage devices typically include a controller portion (e.g., the controller 101) and a memory section (e.g., the memory 103), and use logical-to-physical (L2P) mapping and use management tables for dynamic mapping. The logical-to physical mapping is performed by the controller and associates a physical address on the memory section where data is stored with a logical address by which a host identifies the data. Typically, the management tables are stored in the non-volatile memory, but in order to provide high performance, management table copies are maintained also to a log in the controller RAM, typically a DRAM. As the controller updates these tables during memory operations, the updated tables are stored in the memory section from time to time for synchronization, in an operation called control synchronization or control sync (CS). This operation includes preparing for the CS, submitting a request to write a "log" of the operation, and receiving confirmation that the entire "log" was written successfully. If the system experiences an ungraceful shutdown (UGSD), such as losing power, any information updates made since the last control sync is lost, as this information was only held in volatile control memory. To avoid this problem, the system can operate in a blocking manner, where the flash controller does not send read/write commands to the flash dies, allowing them to complete their workload. Only after the workload is completed, confirmed and the control data is updated in the log are a new set of read/write commands sent.

Referring back to FIG. 3, after a power up (302), the log described above may be used for mounting (304) the data storage device. The controller 101 may determine (306) (e.g., based on a graceful shutdown (GSD) flag being set in the controller) if a previous shutdown was a graceful shutdown or an ungraceful shutdown. If this mount is after a GSD (path labeled 308), then the controller 101 may continue to mount (314) using conventional methods. On the other hand, if the GSD flag is not set (path labeled 310), indicating a UGSD, the controller 101 may recover (312) from UGSD, using the command history buffer as described in the present application. After the recovery, the controller 101 may continue with the control sync (CS) operation that is shown by box 316 in FIG. 3 and described above, upon which mount is complete (318). In this way, the command history buffer may be used to implement both a UGSD and GSD recovery. The controller 101 may load a last good log, and if there is a partial log written or if the log does not indicate a GSD, the controller 101 may recover from UGSD.

Figure 4A:
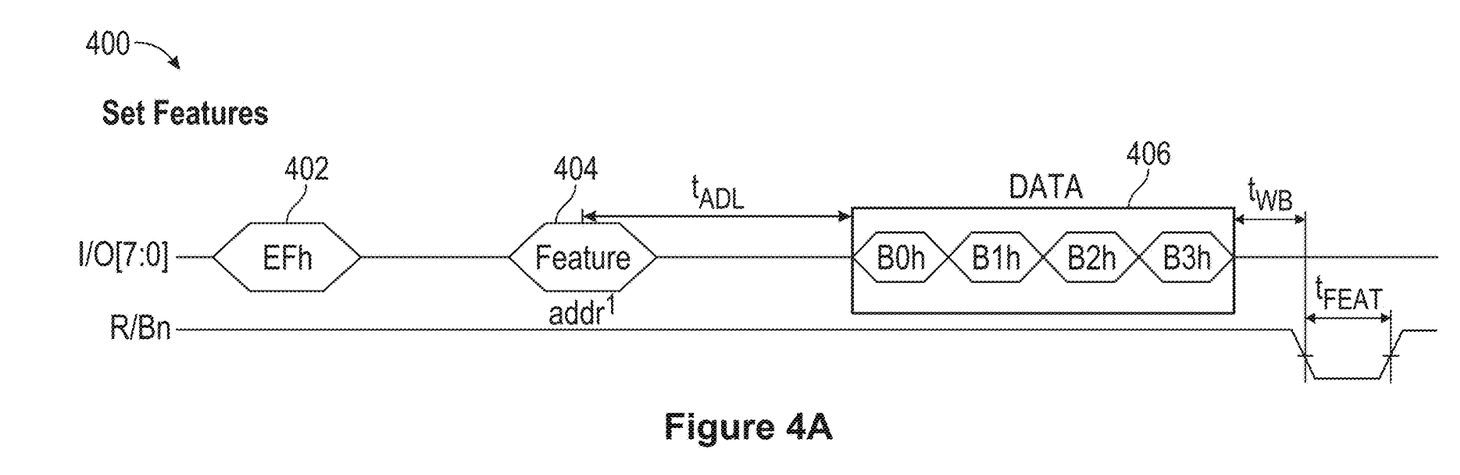
FIGS. 4A and 4B show example command sequences from a NAND specification.
Figure 4B:
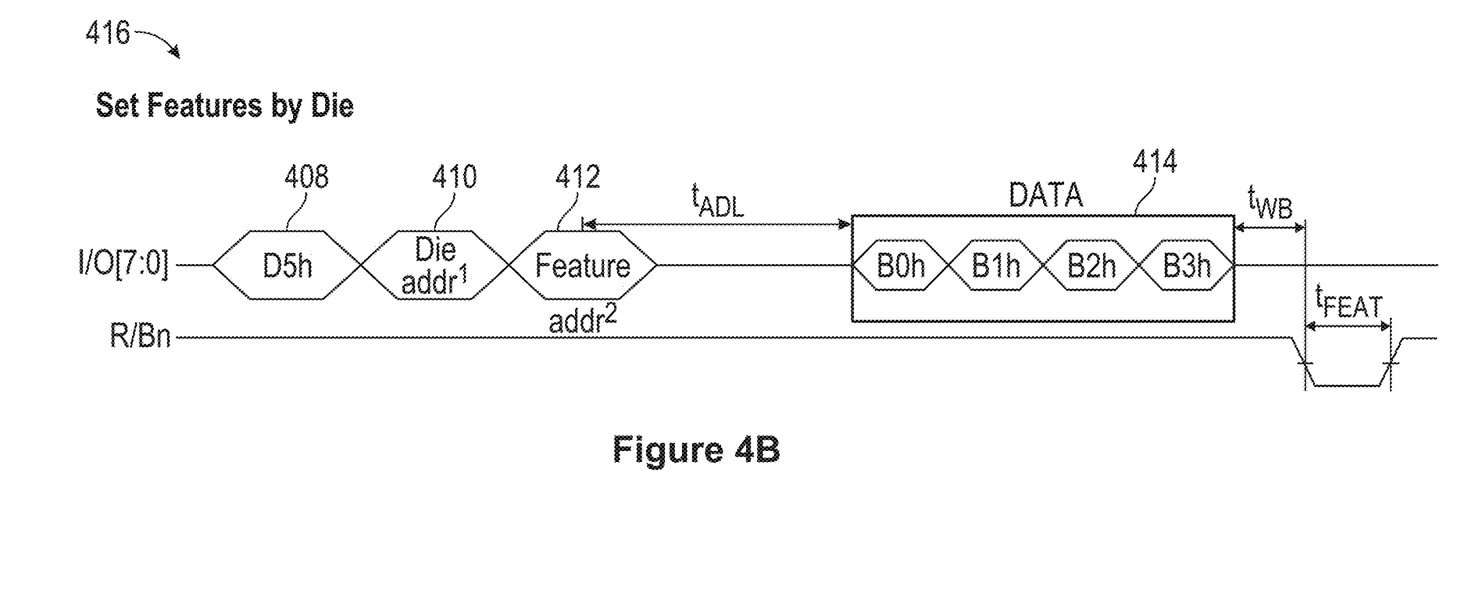

As described above, the command history buffer may be used for failure analysis and debug. The command history buffer may contain the last command sequence received by the NAND (without the user data). The command history buffer may be hardware independent from the NAND pipe flow and may be used to monitor the command sequences and for storing to a dedicated First In First Out (FIFO) buffer. In some aspects, the command history buffer may store data, address and command in a FIFO mechanism, depending on the size of the buffer. The buffer and a NAND access command for accessing the buffer may be available regardless of the state of the NAND (e.g., Busy/Stuck/Brick), similar to NAND reset commands. Buffer size may be at least 32 bytes (or a size of the longest NAND sequence (e.g., SET-FEATURE)). In some aspects, the buffer data may be readable at any time, before or after a freeze or pre-POR (Power on Reset). Data does not refer to user data, but data transferred on the NAND bus, data related to the sequence. FIGS. 4A and 4B show example command sequences (for set feature) from NAND specification. FIG. 4A shows a set features sequence with an opcode 402 (EFh), a feature address 404, and data 406. FIG. 4B shows a set feature by die sequence 416 with an opcode 408, a die address 410, a feature address 412 and data 414.

Some aspects may use the following encoding method for the command history buffer data. A two-bit opcode may be added to each sequence component to distinguish between data, address and command. In the following examples, two bits ([9] and [8]) represent the new opcode and 8 bits ([7] . . . [0]) represent command bytes. For example, opcode bits 0 and 0 may be added to every command. See table below, for command byte 0x30

| [9] | [8] | [7] | [6] | [5] | [4] | [3] | [2] | [1] | [0] |
|---|---|---|---|---|---|---|---|---|---|
| 0 | 0 | 0 | 0 | 1 | 1 | 0 | 0 | 0 | 0 |

For example, opcode bits 0 and 1 may be added to every address. See table below, for address byte 0x57.

| [9] | [8] | [7] | [6] | [5] | [4] | [3] | [2] | [1] | [0] |
|---|---|---|---|---|---|---|---|---|---|
| 0 | 1 | 0 | 1 | 0 | 1 | 0 | 1 | 1 | 1 |

For example, opcode bits 1 and 1 may be added to every data. See table below, for data byte 0x55.

| [9] | [8] | [7] | [6] | [5] | [4] | [3] | [2] | [1] | [0] |
|---|---|---|---|---|---|---|---|---|---|
| 1 | 1 | 0 | 1 | 0 | 1 | 0 | 1 | 0 | 1 |

In some aspects, the command history buffer may be implemented by a latch inside the NAND arrays as a data receiver latch (XDL) that stores necessary data described above. The latch may be in a volatile memory. This implementation may be useful for failure recovery during operation of the data storage device.

In some aspects, the command history buffer may be implemented using a Circuit bounded Array (CbA) Architecture, with no cell annealing in a CMOS wafer, which may include flash management. The NAND array may be implemented in a wafer that is different from the CMOS wafer.

The command history buffer and the techniques described above herein may be used for operational flows, such as the improved boot flow above, and for failure analysis and debug. The buffer may include the data, address and commands received by the NAND, which is not available in conventional systems. In conventional systems, the firmware has copies of the sent data, address, and commands, and it is not aware of the actual data received by the NAND that might be erroneous. The techniques described herein make communication and data mismatches easier to detect and correct in runtime.

It may be instructive to describe the structures shown in FIGS. 1, 2, 3, 4A and 4B, with respect to FIG. 5, a flowchart illustrating an example process 500 for failure recovery using a command history buffer in a data storage device, according to one or more embodiments. One or more blocks of FIG. 5 may be executed by a computing system (including, e.g., a controller of a flash memory, a data storage controller of a data storage system or a solid state storage device (SSD), a processor, or the like). Example of a computing system or a controller may be the controller 101. Similarly, a non-transitory machine-readable medium may include machine-executable instructions thereon that, when executed by a computer or machine, perform the blocks of FIG. 5. The steps of process 500 may be implemented as hardware, firmware, software, or a combination thereof. For example, a data storage device (e.g., the storage device 100) includes a submission queue for receiving host commands from a host system. The data storage device also includes a controller (e.g., the controller 101). The data storage device may include a device memory which may include one or more memories (e.g., the flash memories 103) and a command history buffer (described above, e.g., a FIFO buffer). The device memory may be configured to receive and process (i) one or more commands directed to the one or more memories, and (ii) an access command for accessing the command history buffer. These operations may be performed by the controller 107 within each flash memory 103. The command history buffer may be implemented in the registers 106. The command history buffer is configured to store information related to the one or more commands. The controller is coupled to the device memory and is configured to: send (502) the one or more commands to the device memory; retrieve (504) information stored in the command history buffer from the device memory, by issuing the access command; and in accordance with a determination that the information stored in the command history buffer indicates one or more invalid command flows, resend (506) at least a portion of the one or more commands to the device memory.

In some aspects, the controller 101 may be further configured to retrieve information stored in the command history buffer from the device memory after a power up of the controller but before a power up of the one or more memories. For example, the command history buffer may be in the controller 107, in nonvolatile memory, and components 106, 107 and 108 of the flash memory 103 are configured to be powered up approximately together.

In some aspects, the controller 101 may be further configured to resend at least the portion of the one or more commands to the device memory, after determining that a power of the one or more memories is above a predetermined threshold.

In some aspects, the controller 101 may be further configured to: generate and store a log of the one or more commands; and determine whether the information stored in the command history buffer indicates the one or more invalid command flows by detecting erroneous bits based on the log.

In some aspects, the controller 101 may be configured to operate at a first voltage, the one or more memories are configured to operate at a second voltage, and the first voltage is lower than the second voltage. For example, the controller 101 may operate at 0.9 Volts, whereas the flash memory may operate at 1.9 Volts.

In some aspects, the controller 101 may be configured to determine that the information stored in the command history buffer indicates the one or more invalid command flows before the one or more memories power up.

In some aspects, the controller 101 may include a flash interface module (FIM) configured to send the one or more commands. The command history buffer may be configured to continuously receive, from the FIM, and store the information related to the one or more commands.

In some aspects, the controller 101 may be further configured to retrieve the information stored in the command history buffer, determine if the information stored in the command history buffer indicates the one or more invalid command flows, and resend at least the portion of the one or more commands to the device memory, as part of an initial boot flow sequence, a self-test, or an initial handshake with the device memory.

In some aspects, the command history buffer may be configured to facilitate monitoring the one or more commands received by the device memory and store the information related to the one or more commands in a first in first out manner, he one or more commands comprise a plurality of command. At a given time, the command history buffer may be configured to store the information related to a most recent one of the one or more commands, rather than storing the information related to all of the plurality of commands.

In some aspects, the command history buffer may be configured to store the information related to a command of the one or more commands by storing data relating to the command, an address of the command, and the command, wherein the data is not a user data, and wherein the command is a most recent command. The data is part of the NAND sequence, such as data used for setting parameters in the NAND and not data that is stored for a user (e.g., pictures, videos).

In some aspects, the one or more memories include a NAND array. The most recent command may correspond to a NAND command sequence, and the data may correspond to data transferred on a NAND bus relating to the command.

In some aspects, the command history buffer is configured to store one or more opcodes to distinguish between the data, the address and the command.

In some aspects, the device memory 103 (e.g., the controller 107 within the device memory 103) may be configured to receive and process the access command that allows access to the command history buffer, irrespective of whether the device memory is in a busy, stuck, or a brick state (similar to device memory reset commands).

In some aspects, the device memory (e.g., the controller 107 within the device memory 103) may be configured to process a set of commands having respective lengths, and the command history buffer is configured to store at least a command having a maximum length amongst the set of commands (e.g., the command history buffer typically stores the last command, but has a depth of 32 bytes, and may store as many commands as may fit in those 32 bytes).

In some aspects, the command history buffer is configured to be read at any time during operation, during a freeze, or prior to a power on reset, of the device memory.

In some aspects, the one or more memories 103 may include a NAND array. The command history buffer may include a latch inside the NAND array (a latch may be a volatile memory or a cache memory; if volatile memory, the latch can be used during operation, may not be used at power up, after a shut-down).

In some aspects, the device memory 103 may further include a flash management module (e.g., a module within the controller 107) that includes the command history buffer.

In some aspects, the command history buffer may be implemented with no cell annealing in a complementary metal-oxide-semiconductor wafer.

In some aspects, the one or more memories 108 and the command history buffer may be implemented in different semiconductor wafers.

In some aspects, the controller 101 may include a queue, and the controller may be configured to: store the one or more commands in the queue; and in accordance with a determination that the information stored in the command history buffer indicates that the a portion of the queue has not been completed, resend a command corresponding to the portion of the queue to the device memory.

Various examples of aspects of the disclosure are described below. These are provided as examples, and do not limit the subject technology.

One or more aspects of the subject technology provide a data storage device that may include a device memory and a controller. The device memory comprises one or more memories and a command history buffer, the device memory configured to receive and process (i) one or more commands directed to the one or more memories, and (ii) an access command for accessing the command history buffer, wherein the command history buffer is configured to store information related to the one or more commands. The controller is coupled to the device memory and configured to: send the one or more commands to the device memory; retrieve information stored in the command history buffer from the device memory, by issuing the access command; and in accordance with a determination that the information stored in the command history buffer indicates one or more invalid command flows, resend at least a portion of the one or more commands to the device memory.

In some aspects, the controller is further configured to: retrieve information stored in the command history buffer from the device memory after a power up of the controller but before a power up of the one or more memories.

In some aspects, the controller is further configured to: resend at least the portion of the one or more commands to the device memory, after determining that a power of the one or more memories is above a predetermined threshold.

In some aspects, the controller is further configured to: generate and store a log of the one or more commands; and determine whether the information stored in the command history buffer indicates the one or more invalid command flows by detecting erroneous bits based on the log.

In some aspects, the controller is configured to operate at a first voltage, the one or more memories are configured to operate at a second voltage, and the first voltage is lower than the second voltage.

In some aspects, the controller is configured to determine that the information stored in the command history buffer indicates the one or more invalid command flows before the one or more memories power up.

In some aspects, the controller includes a flash interface module (FIM) configured to send the one or more commands, and wherein the command history buffer is configured to continuously receive, from the FIM, and store the information related to the one or more commands.

In some aspects, the controller is further configured to: retrieve the information stored in the command history buffer, determine if the information stored in the command history buffer indicates the one or more invalid command flows, and resend at least the portion of the one or more commands to the device memory, as part of an initial boot flow sequence, a self-test, or an initial handshake with the device memory.

In some aspects, the command history buffer is configured to facilitate monitoring the one or more commands received by the device memory and store the information related to the one or more commands in a first in first out manner, wherein the one or more commands comprise a plurality of commands, and wherein at a given time, the command history buffer is configured to store the information related to a most recent one of the one or more commands, rather than storing the information related to all of the plurality of commands.

In some aspects, the command history buffer is configured to store the information related to a command of the one or more commands by storing data relating to the command, an address of the command, and the command, wherein the data is not a user data, and wherein the command is a most recent command.

In some aspects, the one or more memories comprise a NAND array, wherein the most recent command corresponds to a NAND command sequence, and wherein the data corresponds to data transferred on a NAND bus relating to the command.

In some aspects, the command history buffer is configured to store one or more opcodes to distinguish between the data, the address and the command.

In some aspects, the device memory is configured to receive and process the access command that allows access to the command history buffer, irrespective of whether the device memory is in a busy, stuck, or a brick state.

In some aspects, the device memory is configured to process a set of commands having respective lengths, and the command history buffer is configured to store at least a command having a maximum length amongst the set of commands.

In some aspects, the command history buffer is configured to be read at any time during operation, during a freeze, or prior to a power on reset, of the device memory.

In some aspects, the one or more memories comprise a NAND array, and wherein the command history buffer comprises a latch inside the NAND array.

In some aspects, the device memory further comprises a flash management module that includes the command history buffer.

In some aspects, the controller comprises a queue, and the controller is configured to: store the one or more commands in the queue; and in accordance with a determination that the information stored in the command history buffer indicates that the a portion of the queue has not been completed, resend a command corresponding to the portion of the queue to the device memory.

In other aspects, methods are provided for failure recovery in data storage devices using a command history buffer. According to some aspects, a method may be implemented using one or more controllers for one or more data storage devices. The method may include: sending one or more commands to a device memory, wherein the one or more commands are directed to one or more memories of the device memory, thereby causing a command history buffer the device memory to store information related to the one or more commands; retrieving information stored in the command history buffer from the device memory, by issuing an access command; and in accordance with a determination that the information stored in the command history buffer indicates one or more invalid command flows, resending at least a portion of the one or more commands to the device memory.

In further aspects, a system may include: means for sending one or more commands to a device memory, wherein the one or more commands are directed to one or more memories of the device memory, thereby causing a command history buffer the device memory to store information related to the one or more commands; means for retrieving information stored in the command history buffer from the device memory, by issuing an access command; and means for, in accordance with a determination that the information stored in the command history buffer indicates one or more invalid command flows, resending at least a portion of the one or more commands to the device memory.

Disclosed are systems and methods providing active time-based prioritization in host-managed stream devices. Thus, the described methods and systems provide performance benefits that improve the functioning of a storage device.

It is understood that other configurations of the subject technology will become readily apparent to those skilled in the art from the detailed description herein, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A data storage device, comprising:
   a device memory comprising one or more memories and a command history buffer, the device memory configured to receive and process (1) one or more commands directed to the one or more memories, and (ii) an access command for accessing the command history buffer, wherein the command history buffer is configured to store information related to the one or more commands; and
   a controller coupled to the device memory and configured to:
      send the one or more commands to the device memory;
      retrieve the information related to the one or more commands stored in the command history buffer from the device memory, by issuing the access command; and in accordance with a determination that there is a mismatch between the one or more commands sent to the device memory and the information related to the one or more commands retrieved from the device memory, resend at least a portion of the one or more commands to the device memory, wherein the controller is further configured to retrieve the information stored in the command history buffer from the device memory after a power up of the controller but before a power up of the one or more memories.

2. The data storage device of claim 1, wherein the controller is further configured to:
resend at least the portion of the one or more commands to the device memory after determining that a power of the one or more memories is above a predetermined threshold.

3. The data storage device of claim 1, wherein the controller is further configured to:
store the one or more commands; and
determine that there is the mismatch between the one or more commands sent to the device memory and the information related to the one or more commands retrieved from the device memory by detecting erroneous bits based on the information.

4. The data storage device of claim 1, wherein:
the controller is configured to operate at a first voltage;
the one or more memories are configured to operate at a second voltage; and
the first voltage is lower than the second voltage.

5. The data storage device of claim 1, wherein the controller is configured to determine that there is the mismatch between the one or more commands sent to the device memory and the information related to the one or more commands retrieved from the device memory before the one or more memories power up.

6. The data storage device of claim 1, wherein the controller includes a flash interface module (FIM) configured to send the one or more commands, and wherein the command history buffer is configured to continuously receive, from the FIM, and store the information related to the one or more commands.

7. The data storage device of claim 1, wherein the controller is further configured to:
retrieve the information related to the one or more commands stored in the command history buffer from the device memory, determine that there is the mismatch between the one or more commands sent to the device memory and the information related to the one or more commands retrieved from the device memory, and resend at least the portion of the one or more commands to the device memory, as part of an initial boot flow sequence, a self-test, or an initial handshake with the device memory.

8. The data storage device of claim 1, wherein the command history buffer is configured to facilitate monitoring the one or more commands received by the device memory and store the information related to the one or more commands in a first in first out manner,
wherein the one or more commands comprise a plurality of commands, and
wherein at a given time, the command history buffer is configured to store the information related to a most recent one of the one or more commands, rather than storing the information related to all of the plurality of commands.

9. The data storage device of claim 1, wherein the command history buffer is configured to store the information related to a command of the one or more commands by storing data relating to the command, an address of the command, and the command, wherein the data is not a user data, and wherein the command is a most recent command.

10. The data storage device of claim 9, wherein the one or more memories comprise a NAND array, wherein the most recent command corresponds to a NAND command sequence, and wherein the data corresponds to data transferred on a NAND bus relating to the command.

11. The data storage device of claim 9, wherein the command history buffer is configured to store one or more opcodes to distinguish between the data, the address and the command.

12. The data storage device of claim 1, wherein the device memory is configured to receive and process the access command that allows access to the command history buffer, irrespective of whether the device memory is in a busy, stuck, or a brick state.

13. The data storage device of claim 1, wherein the device memory is configured to process a set of commands having respective lengths, and the command history buffer is configured to store at least a command having a maximum length amongst the set of commands.

14. The data storage device of claim 1, wherein the command history buffer is configured to be read at any time during operation, during a freeze, or prior to a power on reset, of the device memory.

15. The data storage device of claim 1, wherein the one or more memories comprise a NAND array, and wherein the command history buffer comprises a latch inside the NAND array.

16. The data storage device of claim 1, wherein the device memory further comprises a flash management module that includes the command history buffer.

17. The data storage device of claim 1, wherein the controller comprises a queue, and the controller is configured to:
store the one or more commands in the queue; and
in accordance with a determination that the information stored in the command history buffer indicates that the a portion of the queue has not been completed, resend a command corresponding to the portion of the queue to the device memory.

18. A method implemented using one or more controllers for one or more data storage devices, the method comprising:
sending one or more commands to a device memory, wherein the one or more commands are directed to one or more memories of the device memory, thereby causing a command history buffer of the device memory to store information related to the one or more commands;
retrieving the information related to the one or more commands stored in the command history buffer from the device memory, by issuing an access command; and
in accordance with a determination that there is a mismatch between the one or more commands sent to the device memory and the information related to the one or more commands retrieved from the device memory, resending at least a portion of the one or more commands to the device memory,
wherein retrieving the information comprises retrieving the information stored in the command history buffer from the device memory after a power up of the one or more controllers but before a power up of the one or more memories.

19. A system, comprising:
- means for sending one or more commands to a device memory, wherein the one or more commands are directed to one or more memories of the device memory, thereby causing a command history buffer of the device memory to store information related to the one or more commands;
- means for retrieving the information related to the one or more commands stored in the command history buffer from the device memory, by issuing an access command; and
- means for, in accordance with a determination that there is a mismatch between the one or more commands sent to the device memory and the information related to the one or more commands retrieved from the device memory, resending at least a portion of the one or more commands to the device memory,
- wherein the means for retrieving the information comprises means for retrieving the information stored in the command history buffer from the device memory after a power up of a controller but before a power up of the one or more memories.

* * * * *